(12) United States Patent
Namikawa et al.

(10) Patent No.: US 10,562,568 B2
(45) Date of Patent: Feb. 18, 2020

(54) VEHICLE CONTROL DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Isao Namikawa, Okazaki (JP); Takahiro Toko, Takahama (JP); Hiromasa Tamaki, Okazaki (JP); Yuji Okuda, Okazaki (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 15/837,598

(22) Filed: Dec. 11, 2017

(65) Prior Publication Data

US 2018/0162445 A1    Jun. 14, 2018

(30) Foreign Application Priority Data

Dec. 14, 2016   (JP) .................................. 2016-242629

(51) Int. Cl.
    *B62D 15/02*          (2006.01)
    *G08G 1/16*           (2006.01)
    (Continued)

(52) U.S. Cl.
CPC ....... *B62D 15/0265* (2013.01); *B62D 5/0463* (2013.01); *B62D 6/08* (2013.01);
(Continued)

(58) Field of Classification Search
CPC .... B62D 15/0265; B62D 15/025; B62D 6/08; B62D 5/0463; G08G 1/161; G08G 1/167
See application file for complete search history.

(56) References Cited

U.S. PATENT DOCUMENTS

| | | | |
|---|---|---|---|
| 6,538,622 B1 * | 3/2003 | Kojima | ............... B60R 16/0231<br>340/901 |
| 7,272,484 B1 * | 9/2007 | Maeda | .................. B60W 30/20<br>180/65.25 |

(Continued)

FOREIGN PATENT DOCUMENTS

| | | |
|---|---|---|
| EP | 1304275 A1 | 4/2003 |
| JP | 2015-020604 A | 2/2015 |
| JP | 2015-033942 A | 2/2015 |

OTHER PUBLICATIONS

May 14, 2018 Search Report issued in European Patent Application No. 17206665.6.

*Primary Examiner* — Russell Frejd

(74) *Attorney, Agent, or Firm* — Oliff PLC

(57) ABSTRACT

A vehicle control device includes a control unit configured to execute one of a plurality of assist controls based on an input of an execution command signal that is externally given. The control unit includes a control state switching unit that executes, based on an input state of the execution command signal, switching of a control state to execute the assist control. The control state includes a first control state and a second control state, the control state being switched from one of the first and second control states to the other of the first and second control states based on the input state of the execution command signal. When one control state of the first and second control states is being executed and when execution of the other control state is commanded, the control state switching unit switches the control state such that the other control state is executed.

7 Claims, 5 Drawing Sheets

(51) Int. Cl.
*B62D 6/08* (2006.01)
*B62D 5/04* (2006.01)
(52) U.S. Cl.
CPC ........... *B62D 15/025* (2013.01); *G08G 1/161* (2013.01); *G08G 1/167* (2013.01)

(56) References Cited

U.S. PATENT DOCUMENTS

| | | | | |
|---|---|---|---|---|
| 8,798,833 | B2 * | 8/2014 | Kusumi | B60K 6/46 |
| | | | | 701/22 |
| 2005/0216169 | A1 * | 9/2005 | Arai | B60K 31/0008 |
| | | | | 701/96 |
| 2009/0234550 | A1 * | 9/2009 | Takeuchi | B60K 28/06 |
| | | | | 701/70 |
| 2013/0035813 | A1 * | 2/2013 | Kusumi | B60K 6/46 |
| | | | | 701/22 |
| 2016/0129934 | A1 | 5/2016 | Akatsuka et al. | |

* cited by examiner

VEHICLE CONTROL DEVICE

INCORPORATION BY REFERENCE

The disclosure of Japanese Patent Application No. 2016-242629 filed on Dec. 14, 2016 including the specification, drawings and abstract is incorporated herein by reference in its entirety.

BACKGROUND

1. Technical Field

The disclosure relates to a vehicle control device.

2. Description of Related Art

As a vehicle control device that executes a control to assist driving by a user, there is a vehicle control device that executes a traveling assist control that enables a vehicle to travel while keeping a traveling lane (for example, Japanese Patent Application Publication No. 2015-33942 (JP 2015-33942 A)).

JP 2015-33942 A discloses that the vehicle control device switches a control state for executing the traveling assist control, based on an input of an execution command signal from another control device.

SUMMARY

In recent years, for example, there has been proposed a vehicle control device that executes a collision avoidance assist control that enables a vehicle to travel while avoiding collision, in addition to the traveling assist control. In this case, the vehicle control device needs to switch the control state more smoothly, based on the input state of the execution command signal.

The disclosure provides a vehicle control device that can switch the control state more smoothly.

A vehicle control device in a first aspect of the disclosure includes a control unit that is configured to execute one of a plurality of assist controls, as a control to assist driving by a user, based on an input of an execution command signal that is externally given. In the vehicle control device, the control unit includes a control state switching unit that is configured to execute, based on an input state of the execution command signal, at least switching of a control state to execute the assist control. The control state includes at least a first control state and a second control state, the control state being switched from one of the first control state and the second control state to the other of the first control state and the second control state based on the input state of the execution command signal. When one control state of the first control state and the second control state is being executed and when execution of the other control state is commanded, the control state switching unit switches the control state such that the other control state is executed.

According to the configuration, it is possible to sequentially switch the control state of the control unit between the first control state and the second control state, for executing a control state that should be executed. In this case, even if the deviation of timing occurs when the execution command signal is input or output, it is possible to switch the control state of the control unit such that the latest control state is executed as soon as possible. Thereby, it is possible to switch the control state more smoothly.

A vehicle control device in a second aspect of the disclosure includes a control unit that is configured to execute one of a plurality of assist controls, as a control to assist driving by a user, based on an input of an execution command signal that is externally given. In the vehicle control device, the control unit includes a control state switching unit that is configured to execute, based on an input state of the execution command signal, at least switching of a control state to execute the assist control. In the vehicle control device, the control state includes at least a first control state and a second control state, the control state being switched from one of the first control state and the second control state to the other of the first control state and the second control state based on the input state of the execution command signal. When the execution command signal for the first control state and the execution command signal for the second control state are simultaneously input to the control unit, the control state switching unit continues a control state that is being executed at a time of the input.

According to the configuration, when it is unknown which execution command signal should be executed because the execution command signal for the first control state and the execution command signal for the second control state are simultaneously input to the control unit, it is possible to continue at least the control state that is being executed at that time. In this case, it is possible to switch the control state based on the execution command signal that is input subsequently, and it is possible to prevent the switching of the control state of the control unit from being retarded. Thereby, it is possible to switch the control state more smoothly.

On this occasion, when the execution command signal for the first control state and the execution command signal for the second control state are simultaneously input to the control unit, the control state switching unit may continue the control state that is being executed at the time of the input, at least until the execution command signal for the first control state or the execution command signal for the second control state is newly commanded. Thereby, it is possible to switch the control state more smoothly and more suitably.

In the vehicle control device, the control unit may use a first control amount that is set based on a target route for a vehicle, as a control amount by which traveling of the vehicle is controlled, in the first control state, and may be configured to use a second control amount that is set based on the target route for the vehicle, as a control amount by which the traveling of the vehicle is controlled, in the second control state. The control unit may be configured to execute the assist control of the traveling of the vehicle such that the vehicle follows the target route, using the first control amount or the second control amount that is respectively set in the first control state or the second control state.

According to the configuration, it is possible to switch the control state more smoothly, and therefore, it is possible to avoid the control amount from becoming more than necessary or becoming less than necessary due to the interference between the first control amount and the second control amount. Accordingly, when the control unit executes the assist control of the traveling of the vehicle such that the vehicle follows the target route, it is possible to enhance the performance of the assist control.

In the vehicle control device, the control unit may control an actuator such that a dynamic power to steer a steered wheel is generated and given to a steering mechanism of the vehicle, using the first control amount or the second control amount that is respectively set in the first control state or the second control state. In this case, the control unit may be configured to use a control amount resulting from adding an assist control amount and the first control amount together, in the first control state, and configured to use a control amount resulting from adding the assist control amount and the second control amount, in the second control state, the assist control amount being set based on an operation state amount that is changed by an operation of the steering mechanism by the user.

It is possible to apply the configuration to a so-called electric power steering device, for which the assist control amount is set, and it is possible to enhance the function of the electric power steering device and enhance the reliability.

According to the disclosure, it is possible to switch the control state in the vehicle control device more smoothly.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
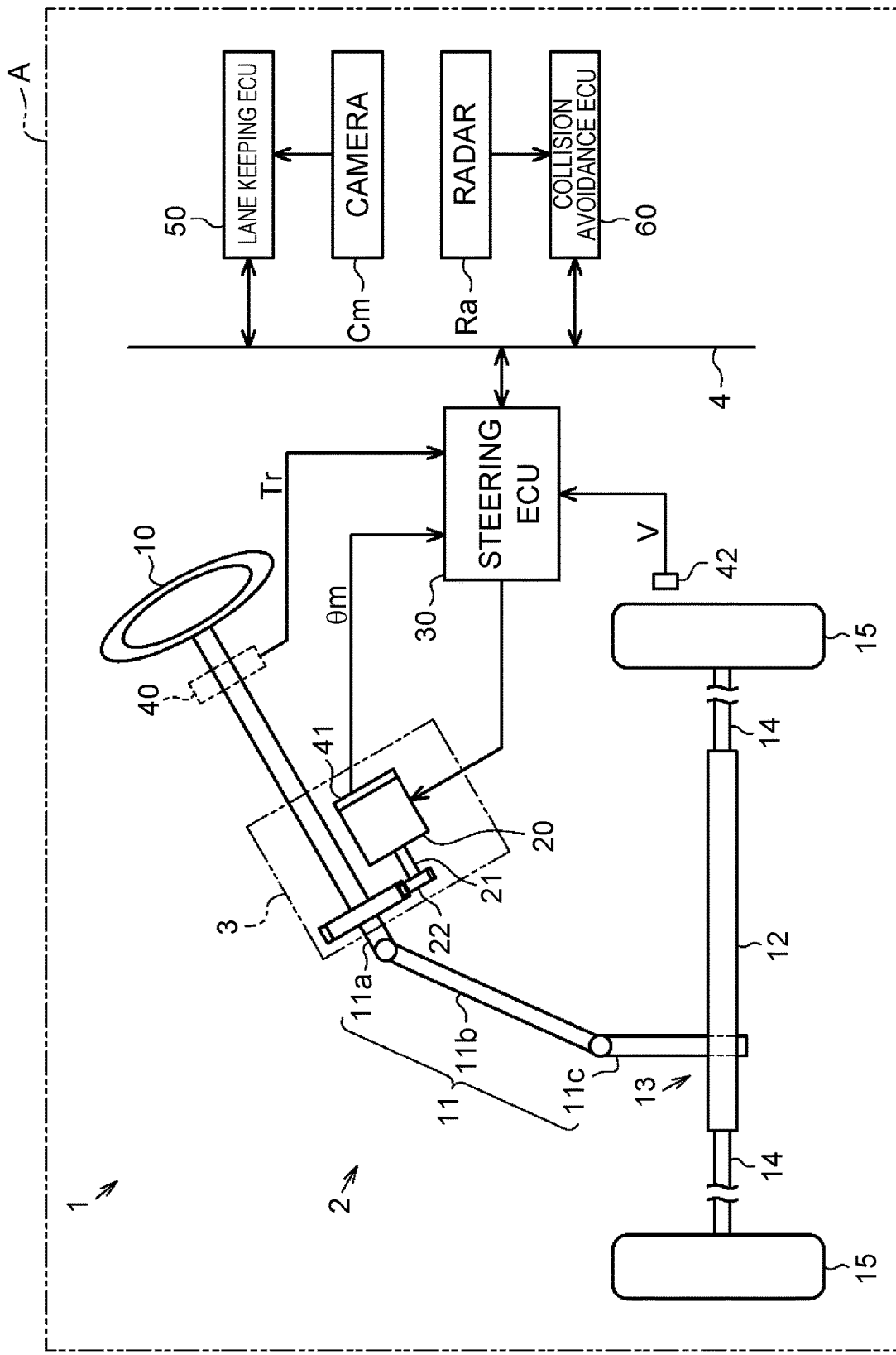
FIG. 1 is a diagram showing an overview of an electric power steering device.

Hereinafter, an embodiment of a vehicle control device will be described. As shown in FIG. 1, a vehicle A is equipped with an electric power steering device 1 that gives a dynamic power for changing the route of the vehicle A to a steering mechanism 2 described later, and thereby assists driving by a user through the assist of steering operation by the user.

The steering mechanism 2 includes a steering wheel 10 that is operated by the user, and a steering shaft 11 that is fixed to the steering wheel 10. The steering shaft 11 includes a column shaft 11a linked with the steering wheel 10, an intermediate shaft 11b linked with a lower end portion of the column shaft 11a, and a pinion shaft 11c linked with a lower end portion of the intermediate shaft 11b. A lower end portion of the pinion shaft 11c is linked with a rack shaft 12 through a rack-and-pinion mechanism 13. A rotational motion of the steering shaft 11 is converted into a reciprocal motion in the axial direction of the rack shaft 12 through the rack-and-pinion mechanism 13. The reciprocal motion is transmitted to right and left steered wheels 15 through tie rods 14 linked with both ends of the rack shaft 12, respectively, and thereby, steering angles of the steered wheels 15 are changed.

An actuator 3 including a motor 20 that is a generation source of the dynamic power to be given to the steering mechanism 2 is provided at the middle of the column shaft 11a fixed to the steering wheel 10. For example, the motor 20 is a surface permanent magnet synchronous motor (SPMSM), and a three-phase brushless motor that rotates based on a drive electric power having three phases (U, V, W). A rotational shaft 21 of the motor 20 is linked with the column shaft 11a through a speed reduction mechanism 22. The actuator 3 transmits a rotational power of the rotational shaft 21 of the motor 20 to the column shaft 11a through the speed reduction mechanism 22. A torque (rotational power) of the motor 20 to be given to the column shaft 11a becomes a dynamic power (steering power), and changes the steering angles of the right and left steered wheels 15.

The actuator 3 is connected to a steering ECU (Electronic Control Unit) 30 that controls drive of the motor 20. The steering ECU 30 controls the drive of the motor 20, based on detection results of various sensors that are provided in the vehicle A. Examples of the various sensors include a torque sensor 40, a rotational angle sensor 41 and a speed sensor 42. The torque sensor 40 is provided on the column shaft 11a, and the rotational angle sensor 41 is provided on the motor 20. The torque sensor 40 detects a steering torque Tr that is an operation state amount to be generated in the steering shaft 11 with a change by user's steering operation. The rotational angle sensor 41 detects a rotational angle θm of the rotational shaft 21 of the motor 20. The speed sensor 42 detects a vehicle speed V that is a traveling speed of the vehicle A. In the embodiment, the steering torque Tr is an example of the operation state amount.

The steering ECU 30 is communicably connected to a lane keeping ECU (Electronic Control Unit) 50 and a collision avoidance ECU (Electronic Control Unit) 60 that are equipped in the vehicle A through an in-vehicle network 4 based on CAN (Controller Area Network (R)).

The lane keeping ECU 50 commands the steering ECU 30 to execute a traveling assist control that enables the vehicle A to travel along a target course (target route) that is set such that the vehicle A travels while keeping a traveling lane. The lane keeping ECU 50 computes the target course to be used in the traveling assist control, based on image data taken by a camera Cm that is equipped in the vehicle A.

The collision avoidance ECU 60 commands the steering ECU 30 to execute a collision avoidance assist control that enables the vehicle A to travel along a target course (target route) that is set such that the vehicle A travels while avoiding collision. The collision avoidance ECU 60 computes the target course to be used in the collision avoidance assist control, based on a detection result by a radar Ra that is equipped in the vehicle A.

The target course computed by the lane keeping ECU 50 or the collision avoidance ECU 60 is the information indicating a relative direction for the vehicle A with respect to a road and a route for the vehicle A. Next, an electric configuration of the electric power steering device 1 will be described with functions of the steering ECU 30.

Figure 2:
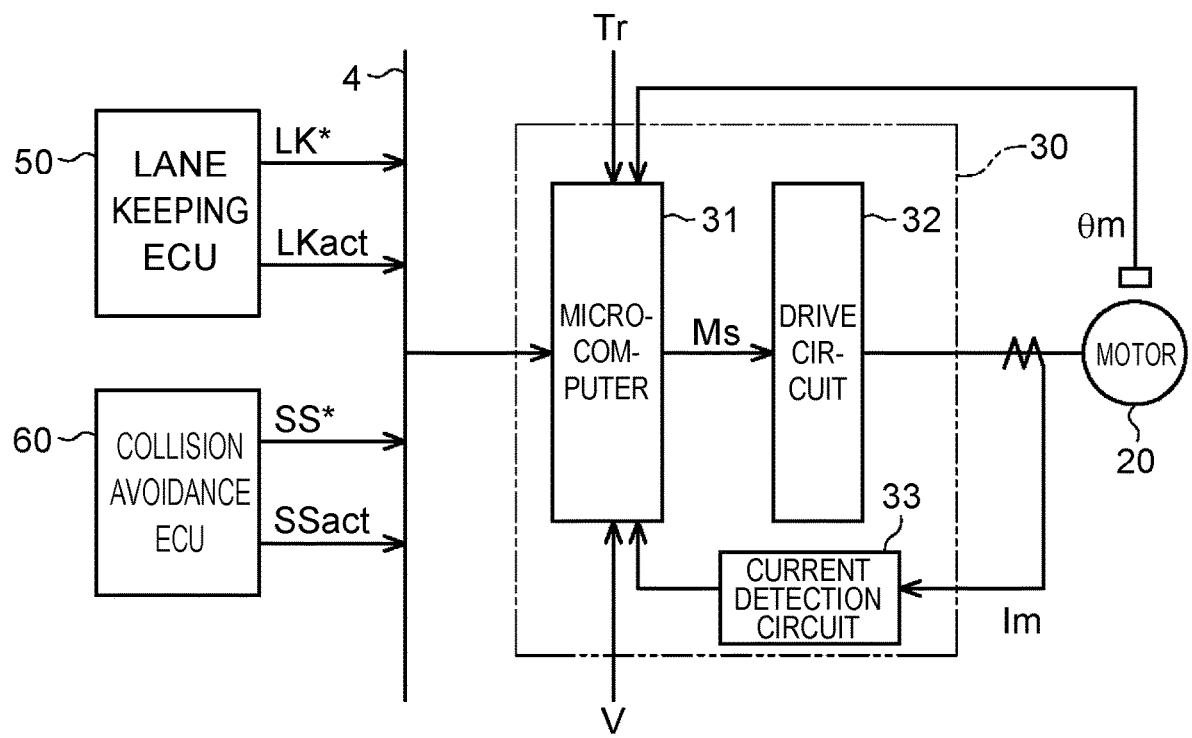
FIG. 2 is a block diagram showing an electric configuration of a steering ECU that embodies a vehicle control device.

As shown in FIG. 2, the steering ECU 30 includes a microcomputer 31 that generates a motor control signal Ms, a drive circuit 32 such as an inverter that supplies current to the motor 20 based on the motor control signal Ms, and a current detection circuit 33 that detects an actual current Im of the motor 20. In the embodiment, the steering ECU 30 is an example of the vehicle control device, and the microcomputer 31 is an example of the control unit.

The microcomputer 31 receives detection results of the current detection circuit 33, the torque sensor 40, the rotational angle sensor 41 and the vehicle speed sensor 42, and command values and execution command signals from the lane keeping ECU 50 and the collision avoidance ECU 60. Further, the microcomputer 31 generates the motor control signal Ms, and outputs the motor control signal Ms to the drive circuit 32 as a PWM signal.

Specifically, the microcomputer 31 receives a lane keeping command value LK* and an execution command signal LKact from the lane keeping ECU 50 through the in-vehicle network 4. Further, the microcomputer 31 receives a collision avoidance command value SS* and an execution command signal SSact from the collision avoidance ECU 60 through the in-vehicle network 4.

The lane keeping ECU 50 outputs the lane keeping command value LK* to the in-vehicle network 4 in a predetermined cycle, as the information indicating the target course computed based on the image data taken by the camera Cm that is equipped in the vehicle A. The lane keeping ECU 50 determines whether the traveling assist control is necessary. In the case of determining that the traveling assist control is necessary, the lane keeping ECU 50 outputs an execution command signal LKact(1) to the in-vehicle network 4, as information for commanding the microcomputer 31 (the steering ECU 30) to start the traveling assist control. In the case of determining that the traveling assist control is unnecessary, the lane keeping ECU 50 outputs an execution command signal LKact(0) to the in-vehicle network 4, as information for commanding the microcomputer 31 (the steering ECU 30) to stop the traveling assist control. The lane keeping ECU 50 outputs one of the execution command signals LKact(1), LKact(0) to the in-vehicle network 4, in a predetermined cycle.

The collision avoidance ECU 60 outputs the collision avoidance command value SS* to the in-vehicle network 4 in a predetermined cycle, as the information indicating the target course computed based on the detection result of the radar Ra that is equipped in the vehicle A. The collision avoidance ECU 60 determines whether the collision avoidance assist control is necessary. In the case of determining that the collision avoidance assist control is necessary, the collision avoidance ECU 60 outputs an execution command signal SSact(1) to the in-vehicle network 4, as information for commanding the microcomputer 31 (the steering ECU 30) to start the collision avoidance assist control. In the case of determining that the collision avoidance assist control is unnecessary, the collision avoidance ECU 60 outputs an execution command signal SSact(0) to the in-vehicle network 4, as information for commanding the microcomputer 31 (the steering ECU 30) to stop the collision avoidance assist control. The collision avoidance ECU 60 outputs one of the execution command signals SSact(1), SSact(0) to the in-vehicle network 4, in a predetermined cycle.

Figure 3:
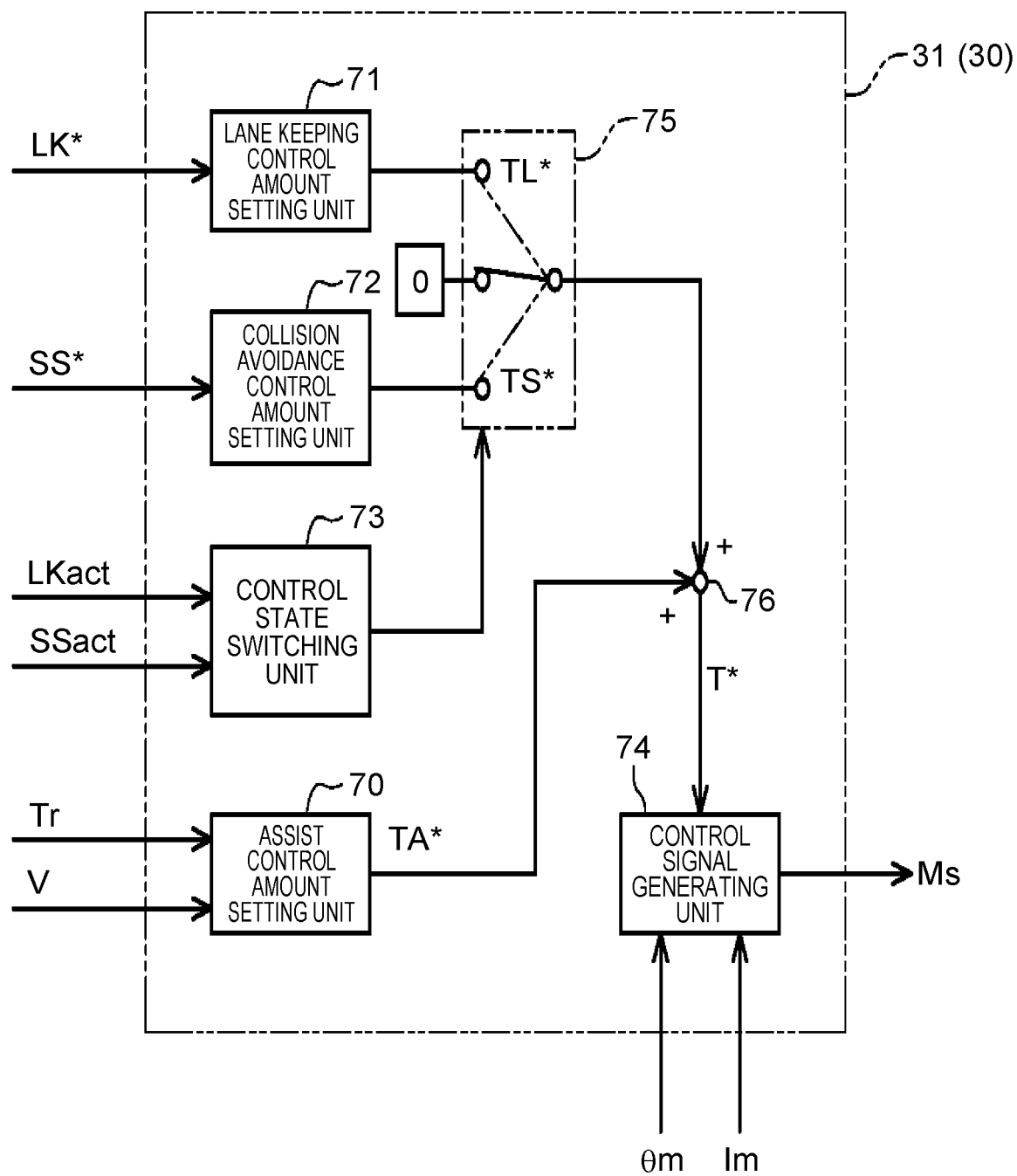
FIG. 3 is a block diagram showing a function of a microcomputer of the steering ECU.

Next, a function of the microcomputer 31 of the steering ECU 30 will be described in detail. As shown in FIG. 3, the microcomputer 31 includes an assist control amount setting unit 70, a lane keeping control amount setting unit 71, a collision avoidance control amount setting unit 72, a control state switching unit 73, and a control signal generating unit 74.

The assist control amount setting unit 70 receives the steering torque Tr and the vehicle speed V from the torque sensor 40 and the speed sensor 42. Based on the steering torque Tr and the vehicle speed V, the assist control amount setting unit 70 sets and outputs an assist control amount TA* that is a target value of the amount of the current to be generated by the motor 20. The assist control amount TA* is a target value of assist torque that is given for assisting (supporting) the steering operation by the user.

The lane keeping control amount setting unit 71 receives the lane keeping command value LK* output from the lane keeping ECU 50 through the in-vehicle network 4. Based on the lane keeping command value LK*, the lane keeping control amount setting unit 71 sets and outputs a lane keeping control amount TL* that is a target value of the amount of the current to be generated by the motor 20. The lane keeping control amount TL* is a target value of assist torque for assisting (supporting) the steering operation by the user such that the vehicle A follows the target course computed by the lane keeping ECU 50.

The collision avoidance control amount setting unit 72 receives the collision avoidance command value SS* output from the collision avoidance ECU 60 through the in-vehicle network 4. Based on the collision avoidance command value SS*, the collision avoidance control amount setting unit 72 sets and outputs a collision avoidance control amount TS* that is a target value of the amount of the current to be generated by the motor 20. The collision avoidance control amount TS* is a target value of assist torque for assisting (supporting) the steering operation by the user such that the vehicle A follows the target course computed by the collision avoidance ECU 60.

The control state switching unit 73 receives the execution command signal LKact output from the lane keeping ECU 50 and the execution command signal SSact output from the collision avoidance ECU 60, through the in-vehicle network 4. Based on the execution command signals LKact, SSact, the control state switching unit 73 executes one control state of a traveling assist control state of executing the lane keeping control, a collision avoidance assist control state of executing the collision avoidance assist control, and an electric power steering control state of executing neither the lane keeping control nor the collision avoidance assist control and executing an electric power steering control. The control state switching unit 73 is configured to store the content of the executing control state, as the last control state, in a predetermined storage area, and to update the stored content whenever the executing control state is switched.

Specifically, in the case of executing the traveling assist control state, the control state switching unit 73, based on the execution command signals LKact, SSact, switches the output mode of a control amount output unit 75, such that the lane keeping control amount TL* is output through the control amount output unit 75.

In the case of executing the collision avoidance assist control state, the control state switching unit 73, based on the execution command signals LKact, SSact, switches the output mode of the control amount output unit 75, such that the collision avoidance control amount TS* is output through the control amount output unit 75.

In the case of executing the electric power steering control state, the control state switching unit 73, based on the execution command signal LKact, SSact, switches the output mode of the control amount output unit 75, such that neither the lane keeping control amount TL* nor the collision avoidance control amount TS* is output through the control amount output unit 75. In this case, the control amount output unit 75 outputs a value of zero (0), instead of outputting the lane keeping control amount TL* or the collision avoidance control amount TS*.

In the embodiment, the traveling assist control state and the collision avoidance assist control state are examples of the first control state and the second control state, and the lane keeping control amount TL* and the collision avoidance control amount TS* are examples of the first control amount and the second control amount.

Then, the assist control amount TA* output from the assist control amount setting unit 70 and the control amount output from the control amount output unit 75 are added by an addition processing unit 76. The resulting value is input to the control signal generating unit 74, as an assist torque command value T* that is a target value of the final current amount. The control signal generating unit 74 generates the motor control signal Ms based on the assist torque command value T*, the rotational angle θm obtained from the rotational angle sensor 41 and the actual current Im obtained from the current detection circuit 33, and outputs the motor control signal Ms to the drive circuit 32 as a PWM signal.

Here, the function of the control state switching unit 73 will be described in further detail. In the embodiment, the lane keeping ECU 50 and the collision avoidance ECU 60 are configured to combine and output the execution command signals LKact, SSact, so as to command the microcomputer 31 to execute one control state of the traveling assist control state, the collision avoidance assist control state and the electric power steering control state.

Specifically, when the traveling assist control state is executed, the execution command signals are output to the microcomputer 31, with a combination of the execution command signal LKact(1) from the lane keeping ECU 50 and the execution command signal SSact(0) from the collision avoidance ECU 60. When the collision avoidance assist control state is executed, the execution command signals are output to the microcomputer 31, with a combination of the execution command signal LKact(0) from the lane keeping ECU 50 and the execution command signal SSact(1) from the collision avoidance ECU 60. When the electric power steering control state is executed, the execution command signals are output to the microcomputer 31, with a combination of the execution command signal LKact(0) from the lane keeping ECU 50 and the execution command signal SSact(0) from the collision avoidance ECU 60. The electric power steering control state is executed when the traveling assist control state and the collision avoidance assist control state are not executed by user's switching or when a failsafe control is executed.

Here, in the in-vehicle network 4, data is divided into a plurality of frames each of which has several bits, and the frames are transmitted one by one in preferential order of ID information. Therefore, the execution command signals LKact, SSact are sometimes input to the microcomputer 31, at timings that are mismatched with respect to output timings. This occurs, for example, in the case where another frame having ID information with a higher priority is transmitted to the in-vehicle network 4 while the frames divided from the execution command signals LKact, SSact as the original data are transmitted. Thereby, to the microcomputer 31, the execution command signals LKact, SSact are input at different timings (hereinafter, referred to as a "non-simultaneous input"), or the execution command signals LKact, SSact are input at an identical timing (hereinafter, referred to as a "simultaneous input").

Hence, in the case of the non-simultaneous input of the execution command signals LKact, SSact, the control state switching unit 73 switches the control state such that the control states corresponding to the execution command signals are executed in the order of the input of the execution command signals.

That is, as the control state, the control state switching unit 73 reflects the content of the earlier input execution command signal of the execution command signals LKact, SSact, in advance of the subsequent input. For example, in the case where the execution command signal LKact is input to the microcomputer 31 earlier, the control state is switched based on this input. In this case, although the execution command signal SSact is input to the microcomputer 31 subsequently, the content of the execution command signal LKact is reflected as the control state in advance of the subsequent input. The same goes for the case where the execution command signal SSact is input to the microcomputer 31 earlier.

In the case of the simultaneous input of the execution command signals LKact, SSact, the control state switching unit 73 suspends the switching of the control state, without executing either of the control states corresponding to the input execution command signals. In this case, the control state switching unit 73 suspends the switching of the control state, continues the last control state that is an executing control state at the time of the simultaneous input and that is stored in the predetermined storage area, and continues the last control state until the non-simultaneous input of the execution command signals LKact, SSact.

That is, the control state switching unit 73 continues the last control state as the control state, without reflecting either of the contents of the execution command signals LKact, SSact as the control state. In this case, at the timing of the subsequent non-simultaneous input of the execution command signals LKact, SSact, the control state switching unit 73 executes the switching of the control state, which is suspended at the time of the simultaneous input, based on the earlier input execution command signal, as described above. Here, in the case where the execution command signal LKact(0) and the execution command signal SSact(0) are simultaneously input, the control state switching unit 73 switches the control state such that the electric power steering control state is executed.

According to the embodiment described above, the following operations and effects are obtained. (1) According to the embodiment, in the case where the execution command signals LKact, SSact are non-simultaneously input to the microcomputer 31, it is possible to sequentially switch the control state of the microcomputer 31 between the traveling assist control state and the collision avoidance assist control state, for executing a control state that should be executed.

Figure 4:
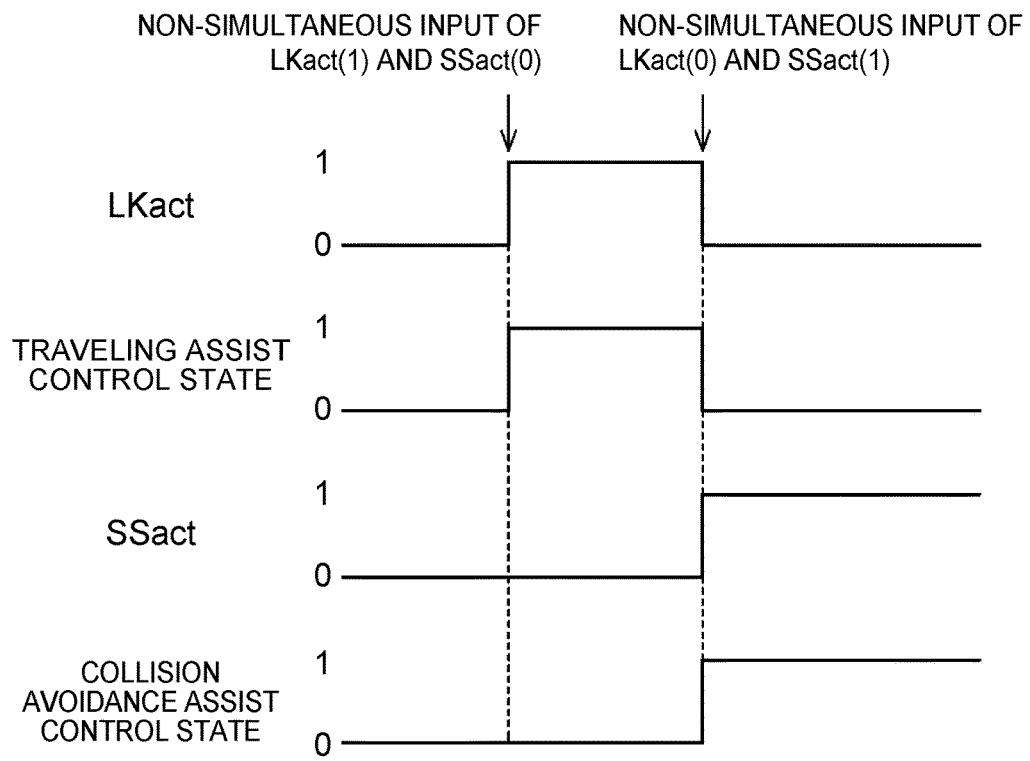
FIG. 4 is a timing chart showing a switching manner of a control state in the case of a non-simultaneous input.

For example, as shown in FIG. 4, in the case where the execution command signals are output from the ECUs 50, 60 with a combination of the execution command signal LKact (1) and the execution command signal SSact(0) for executing the traveling assist control state and where these signals are non-simultaneously input to the microcomputer 31, the content of the earlier input execution command signal is reflected as the control state in advance of the subsequent input. For example, in the case where the execution command signal LKact(1) is input to the microcomputer 31 earlier, the control state is switched such that the traveling assist control state is executed based on this input (the traveling assist control state: 1, the collision avoidance assist control state: 0). In this case, although the execution command signal SSact(0) is input to the microcomputer 31 subsequently, the content of the execution command signal LKact(1) has been already reflected as the control state in advance of the subsequent input. The same goes for the case where the execution command signal SSact(0) is input to the microcomputer 31 earlier.

Similarly, as shown in FIG. 4, in the case where the execution command signals are output from the ECUs 50, 60 with a combination of the execution command signal LKact (0) and the execution command signal SSact(1) for executing the collision avoidance assist control state and where these signals are non-simultaneously input to the microcomputer 31, the content of the earlier input execution command signal is reflected as the control state in advance of the subsequent input. For example, in the case where the execution command signal SSact(1) is input to the microcomputer 31 earlier, the control state is switched such that the collision avoidance assist control state is executed based on this input (the traveling assist control state: 0, the collision avoidance assist control state: 1). In this case, although the execution command signal LKact(0) is input to the microcomputer 31 subsequently, the content of the execution command signal SSact(1) has been already reflected as the control state in advance of the subsequent input. The same goes for the case where the execution command signal LKact(0) is input to the microcomputer 31 earlier.

Thus, even if the deviation of timing occurs when the execution command signals LKact, SSact are input or output, it is possible to switch the control state of the microcomputer 31 such that the latest control state is executed as soon as possible. Thereby, it is possible to switch the control state more smoothly.

(2) According to the embodiment, in the case where the execution command signals LKact, SSact are simultaneously input to the microcomputer 31, it is possible to continue at least the control state that is being executed at that time, when it is unknown which execution command signal should be executed because the execution command signals for the traveling assist control state and the collision avoidance assist control state are simultaneously input to the microcomputer 31.

Figure 5:
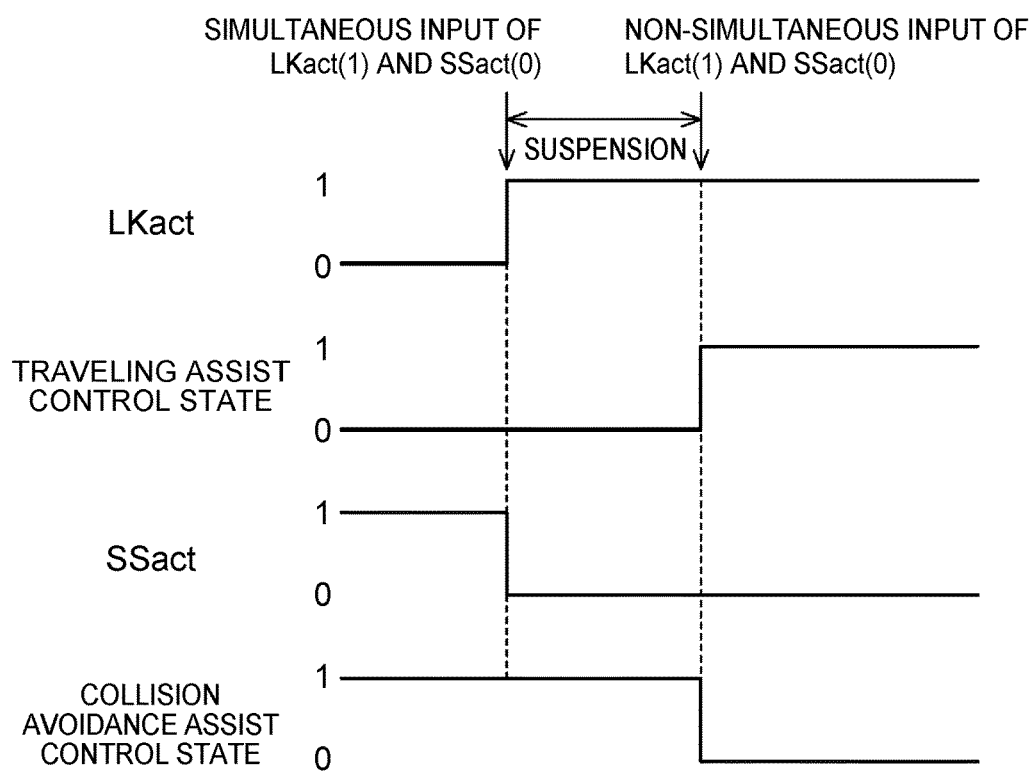
FIG. 5 is a timing chart showing a switching manner of the control state in the case of a simultaneous input.

For example, as shown in FIG. 5, in the case where the execution command signals are output from the ECUs 50, 60 with a combination of the execution command signal LKact (1) and the execution command signal SSact(0) for executing the traveling assist control state and where these signals are simultaneously input to the microcomputer 31, the reflection of both of the contents of the execution command signals is suspended, and the last control state is continued as the control state. For example, in the case where the last control state stored in the predetermined storage area is the collision avoidance assist control state, the collision avoidance assist control state is continued based on the last control state (the traveling assist control state: 0, the collision avoidance assist control state: 1). Thereafter, in the case where the execution command signal LKact(1) and the execution command signal SSact(0) are non-simultaneously input for executing the traveling assist control state, the control state is switched such that the traveling assist control state is executed based on the earlier input execution command signal, as described above (the traveling assist control state: 1, the collision avoidance assist control state: 0).

Figure 6:
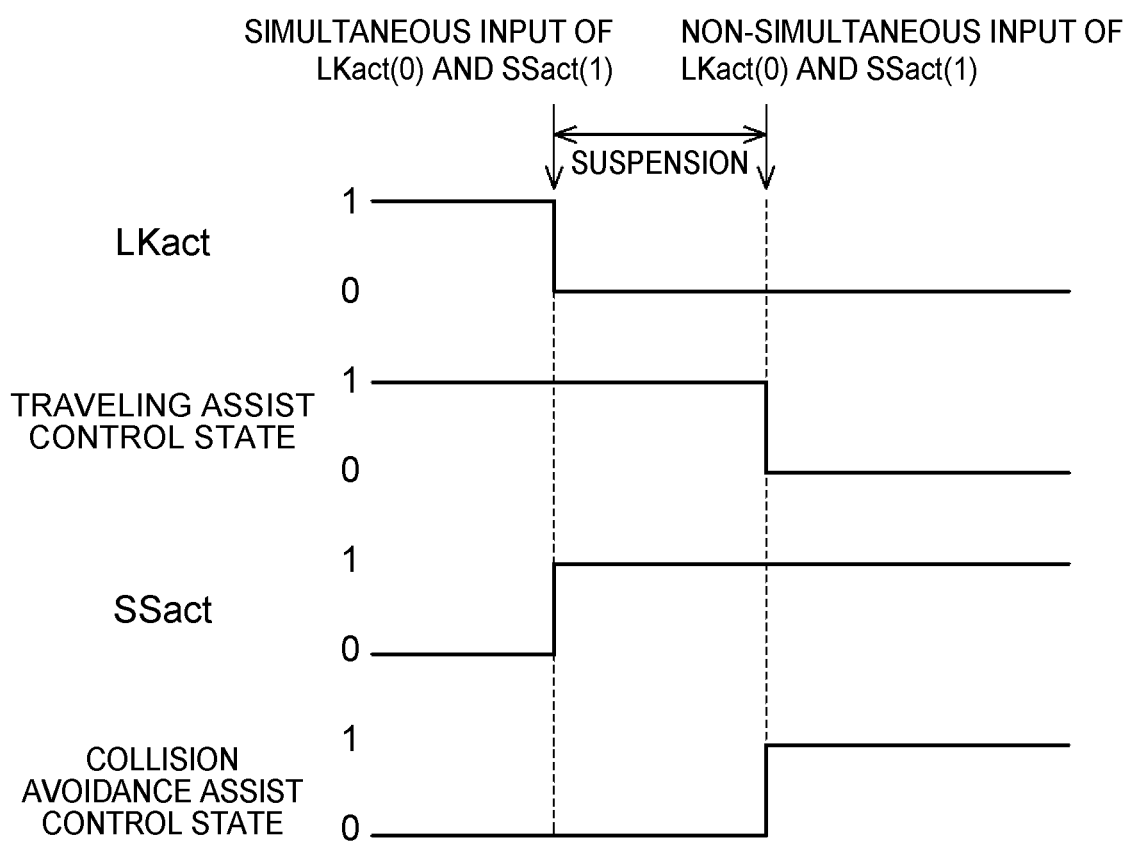
FIG. 6 is a timing chart showing a switching manner of the control state in the case of a simultaneous input.

Further, as shown in FIG. 6, in the case where the execution command signals are output from the ECUs 50, 60 with a combination of the execution command signal LKact (0) and the execution command signal SSact(1) for executing the collision avoidance assist control state and where these signals are simultaneously input to the microcomputer 31, the reflection of both of the contents of the execution command signals is suspended, and the last control state is continued as the control state. For example, in the case where the last control state stored in the predetermined storage area is the traveling assist control state, the traveling assist control state is continued based on the last control state (the traveling assist control state: 1, the collision avoidance assist control state: 0). Thereafter, in the case where the execution command signal LKact(0) and the execution command signal SSact(1) are non-simultaneously input for executing the collision avoidance assist control state, the control state is switched such that the collision avoidance assist control state is executed based on the earlier input execution command signal, as described above (the traveling assist control state: 0, the collision avoidance assist control state: 1).

Thus, it is possible to switch the control state based on the execution command signal that is input after the execution command signals LKact, SSact are simultaneously input to the microcomputer 31, and it is possible to prevent the switching of the control state of the microcomputer 31 from being retarded. Thereby, it is possible to switch the control state more smoothly and more suitably.

(3) According to the embodiment, it is possible to switch the control state of the microcomputer 31 more smoothly, regardless of whether the execution command signals LKact, SSact are input at non-simultaneous timings or at simultaneous timings. Thereby, it is possible to avoid the assist torque command value T* from becoming more than necessary or becoming less than necessary due to the interference between the lane keeping control amount TL* and the collision avoidance control amount TS*. Accordingly, in the case where the assist control of the traveling of the vehicle is executed such that the vehicle follows the target route, it is possible to enhance the performance of the assist control.

(4) By applying the steering ECU 30 in the embodiment to the so-called electric power steering device 1, for which the assist control amount is set, it is possible to enhance the function of the electric power steering device 1 and enhance the reliability.

The embodiment can be carried out in the following modes in which the embodiment is appropriately modified. The collision avoidance assist control state may be executed in preference to the other control states. For example, in the case of the non-simultaneous input, if the collision avoidance assist control state is being executed, the switching of the control state may be suspended until the execution command signal SSact(0) is input to the microcomputer 31. Further, in the case of the simultaneous input, if the execution command signal SSact(1) is input, the control state may be switched such that the collision avoidance assist control state is executed. In these cases, it is possible to enhance the safety for the user.

In the case where the execution command signals LKact, SSact are simultaneously input, it is possible that the execution command signal LKact(1) and the execution command signal SSact(1) are simultaneously input. In this case, the control state may be switched such that the collision avoidance assist control state is preferentially executed similarly to the above-described modification, or the control state may be switched such that the electric power steering control state is executed similarly to the case of the simultaneous input of the execution command signal LKact(0) and the execution command signal SSact(0). Further, in the case of the simultaneous input of the execution command signal LKact(1) and the execution command signal SSact(1), similarly to the case of another simultaneous input, the switching of the control state may be suspended, and the last control state that is an executing control state at the time of the simultaneous input and that is stored in the predetermined storage area may be continued.

In the case of the simultaneous input of the execution command signal LKact(0) and the execution command signal SSact(0), similarly to the case of another simultaneous input, the switching of the control state may be suspended, and the last control state that is an executing control state at the time of the simultaneous input and that is stored in the predetermined storage area may be continued.

In the embodiment, the lane keeping command value LK* and the collision avoidance command value SS* may be embodied by an angle command value indicating a relative angle of the vehicle A to a road, or may be embodied by a torque command value indicating a torque for steering the steered wheels 15 such that the relative angle of the vehicle A to the road is obtained. Here, in the case where the angle command value is used as the lane keeping command value LK* or the collision avoidance command value SS*, the lane keeping control amount setting unit 71 or the collision avoidance control amount setting unit 72 may process the rotational angle θm, may calculate the rotational angle of the column shaft 11a and the steering angles of the steered wheels 15, that is, actual angles, and may set the control amount based on the calculated results. Further, in the case where the torque command value is used as the lane keeping command value LK* or the collision avoidance command value SS*, the lane keeping control amount setting unit 71 or the collision avoidance control amount setting unit 72 may set the torque command value as the control amount with no change.

The traveling assist control or the collision avoidance assist control may assist the driving by the user, by a different method from the method of following the target course. For example, the traveling assist control or the collision avoidance assist control may be achieved by an automatic brake assist control of automatically actuating the brake, a sideslip prevention control (vehicle stability control) or the like.

The function of the lane keeping ECU 50 and the function of the collision avoidance ECU 60 may be achieved by a single ECU having both of the functions integrated therein. In the case, similarly, to the microcomputer 31, the execution command signals LKact, SSact are non-simultaneously input, or the execution command signals LKact, SSact are simultaneously input. In this modification, the same operations and effects as the above embodiment can be obtained.

The in-vehicle network 4 may be other than CAN, and for example, communication methods such as a parallel communication may be adopted. In this case, similarly, to the microcomputer 31, the execution command signals LKact, SSact are non-simultaneously input, or the execution command signals LKact, SSact are simultaneously input. In this modification, the same operations and effects as the above embodiment may be obtained.

In the above embodiment, a further different assist control may be added, other than the traveling assist control and the collision avoidance assist control. When the assist control amount TA* is set, at least the steering torque Tr only needs to be used, and the vehicle speed V does not need to be used. In addition, when the assist control amount TA* is set, the steering torque Tr, the vehicle speed V and another element may be used. When the lane keeping control amount TL* or the collision avoidance control amount TS* is set, at least the lane keeping command value LK* or the collision avoidance command value SS* only needs to be used, and the lane keeping command value LK* or the collision avoidance command value SS* and another element such as the vehicle speed V may be used.

In the above embodiment, the electric power steering device 1 is embodied as a type of giving dynamic power to the column shaft 11a, but a type of giving dynamic power to the rack shaft 12 may be applied. In this case, for example, the torque sensor 40 may be provided on the pinion shaft 11c.

The above embodiment can be applied to a steer-by-wire type steering device, for example. In this case, the actuator 3 may be provided around the rack shaft 12. The modifications may be applied in combination with each other. For example, the configuration of a steer-by-wire type steering device and the configuration of another modification may be applied in combination with each other.

What is claimed is:

1. A vehicle control device comprising a control unit configured to execute one of a plurality of assist controls, as a control to assist driving by a user, based on an input of an execution command signal that is externally given by a lane keeping electronic control unit that computes a target course using image data taken by a camera and by a collision avoidance electronic control unit that computes the target course using a detection result by a radar, wherein:
   the control unit includes a control state switching unit configured to execute, based on an input state of the execution command signal, at least switching of a control state to execute the assist control;
   the control state includes at least a first control state and a second control state, the control state being switched from one of the first control state and the second control state to the other of the first control state and the second control state based on the input state of the execution command signal, the first control state being a traveling assist control state and the second control state being a collision avoidance assist control state; and
   when one control state of the first control state and the second control state is being executed and when execution of the other control state is commanded, the control state switching unit switches the control state such that the other control state is executed.

2. The vehicle control device according to claim 1, wherein:
   the control unit is configured to use a first control amount that is set based on a target route for a vehicle, as a control amount by which traveling of the vehicle is controlled, in the first control state, and use a second control amount that is set based on the target route for the vehicle, as a control amount by which the traveling of the vehicle is controlled, in the second control state; and
   the control unit is configured to execute the assist control of the traveling of the vehicle such that the vehicle follows the target route, using the first control amount or the second control amount that is respectively set in the first control state or the second control state.

3. The vehicle control device according to claim 2, wherein:
   the control unit is configured to control an actuator such that a dynamic power to steer a steered wheel is generated and given to a steering mechanism of the vehicle, using the first control amount or the second control amount that is respectively set in the first control state or the second control state; and
   the control unit is configured to use a control amount resulting from adding an assist control amount and the first control amount together, in the first control state, and configured to use a control amount resulting from adding the assist control amount and the second control amount together, in the second control state, the assist control amount being set based on an operation state amount that is changed by an operation of the steering mechanism by the user.

4. A vehicle control device comprising a control unit configured to execute one of a plurality of assist controls, as a control to assist driving by a user, based on an input of an execution command signal that is externally given by a lane keeping electronic control unit that computes a target course using image data taken by a camera and by a collision avoidance electronic control unit that computes the target course using a detection result by a radar, wherein:

the control unit includes a control state switching unit configured to execute, based on an input state of the execution command signal, at least switching of a control state to execute the assist control;

the control state includes at least a first control state and a second control state, the control state being switched from one of the first control state and the second control state to the other of the first control state and the second control state based on the input state of the execution command signal, the first control state being a traveling assist control state and the second control state being a collision avoidance assist control state; and when the execution command signal for the first control state and the execution command signal for the second control state are simultaneously input to the control unit, the control state switching unit continues a control state that is being executed at a time of the input.

5. The vehicle control device according to claim 4, wherein, when the execution command signal for the first control state and the execution command signal for the second control state are simultaneously input to the control unit, the control state switching unit continues the control state that is being executed at the time of the input, at least until the execution command signal for the first control state or the execution command signal for the second control state is newly commanded.

6. The vehicle control device according to claim 4, wherein:

the control unit is configured to use a first control amount that is set based on a target route for a vehicle, as a control amount by which traveling of the vehicle is controlled, in the first control state, and use a second control amount that is set based on the target route for the vehicle, as a control amount by which the traveling of the vehicle is controlled, in the second control state; and the control unit is configured to execute the assist control of the traveling of the vehicle such that the vehicle follows the target route, using the first control amount or the second control amount that is respectively set in the first control state or the second control state.

7. The vehicle control device according to claim 6, wherein:

the control unit is configured to control an actuator such that a dynamic power to steer a steered wheel is generated and given to a steering mechanism of the vehicle, using the first control amount or the second control amount that is respectively set in the first control state or the second control state; and the control unit is configured to use a control amount resulting from adding an assist control amount and the first control amount together, in the first control state, and configured to use a control amount resulting from adding the assist control amount and the second control amount together, in the second control state, the assist control amount being set based on an operation state amount that is changed by an operation of the steering mechanism by the user.

* * * * *